US012597774B2

(12) United States Patent
Ide et al.

(10) Patent No.: US 12,597,774 B2
(45) Date of Patent: Apr. 7, 2026

(54) SYSTEM, METHOD, AND COMPUTER READABLE STORAGE MEDIUM

(71) Applicant: HONDA MOTOR CO.,LTD., Tokyo (JP)

(72) Inventors: Tatsuya Ide, Saitama (JP); Hakaru Sadano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 407 days.

(21) Appl. No.: 18/471,299

(22) Filed: Sep. 21, 2023

(65) Prior Publication Data

US 2024/0106241 A1 Mar. 28, 2024

(30) Foreign Application Priority Data

Sep. 28, 2022 (JP) ................................. 2022-155619

(51) Int. Cl.
*H02J 3/32* (2006.01)
*H02J 3/14* (2006.01)

(52) U.S. Cl.
CPC .............. *H02J 3/322* (2020.01); *H02J 3/144* (2020.01)

(58) Field of Classification Search
CPC .......... B60L 53/62; B60L 53/63; B60L 53/64; B60L 53/65; B60L 53/68; B60L 55/00;
(Continued)

(56) References Cited

U.S. PATENT DOCUMENTS

2014/0320062 A1 10/2014 Murayama
2015/0255985 A1* 9/2015 Higashi ................... H02J 3/322
700/297
(Continued)

FOREIGN PATENT DOCUMENTS

JP 2013109609 A 6/2013
JP 2014232649 A 12/2014
(Continued)

OTHER PUBLICATIONS

Extended European Search Report for counterpart European Application No. 23200366.5, issued by the European Patent Office on Feb. 5, 2024.
(Continued)

*Primary Examiner* — Omer S Khan

(57) ABSTRACT

A system includes a management module which manages a plurality of vehicles by categorization into a plurality of groups based on combinations of deterioration levels and states of charge of a plurality of batteries included in the plurality of vehicles, and a selection module which selects, based on electric power supply/demand information in an electric power grid, a vehicle in which a battery is to be used for an electric power delivery. A method includes steps of acquiring information representing deterioration levels and states of charge of a plurality of batteries included in a plurality of vehicles, managing the plurality of vehicles by categorization into a plurality of groups based on combinations of the deterioration levels and the states of charge, and selecting, based on electric power supply/demand information in an electric power grid, a vehicle in which a battery is to be used for an electric power delivery.

11 Claims, 8 Drawing Sheets

(58) Field of Classification Search

CPC ......... B60L 58/12; B60L 58/16; G06Q 10/00; G06Q 50/00; H02J 3/144; H02J 3/322; H02J 7/0013; H02J 7/0048; H02J 7/005; Y02T 10/70; Y02T 10/7072; Y02T 90/12

See application file for complete search history.

(56) References Cited

U.S. PATENT DOCUMENTS

| | | | |
|---|---|---|---|
| 2020/0231056 A1* | 7/2020 | Sadano | .................. B60L 53/62 |
| 2020/0282855 A1 | 9/2020 | Slutzky | |
| 2021/0284039 A1 | 9/2021 | Ando | |
| 2023/0138275 A1* | 5/2023 | Furukawa | ............... B60L 53/67 |
| | | | 307/10.1 |

FOREIGN PATENT DOCUMENTS

| | | | |
|---|---|---|---|
| JP | 2021150988 A | 9/2021 |
| JP | 2022050126 A | 3/2022 |
| WO | 2018167943 A1 | 9/2018 |

OTHER PUBLICATIONS

Wang Lu et al., "Dispatch of Vehicle-to-Grid Battery Storage Using an Analytic Hierarchy Process", IEEE Transactions on Vehicular Technology, IEEE, USA, vol. 66, No. 4, Apr. 30, 2017, pp. 2952-2965.

Landi Marco et al., "Battery Management in V2G-based Aggregations", The Institute of Electrical and Electronics Engineers, Inc, (IEEE) Conference Proceedings, [Online] Aug. 22, 2014, Retrieved from the internet: https://ieeexplore.ieee.org/document/7038109.

Office Action issued for counterpart Japanese Application No. 2022-155619, transmitted from the Japanese Patent Office on Sep. 2, 2025 (drafted on Aug. 27, 2025).

* cited by examiner

| USER | TIME CHANGE | CHANGE IN THE VEHICLE TYPE | DESIGNATION OF THE VEHICLE TYPE | DEPARTURE PLACE | DESTINATION | DEPARTURE TIME | ARRIVAL TIME | STAYING TIME |
|---|---|---|---|---|---|---|---|---|
| A | ALLOWED | ALLOWED | VEHICLE TYPE 1 | OFFICE | BRANCH 1 | 12:45 | 12:55 | 10 |
| A | ALLOWED | ALLOWED | VEHICLE TYPE 1 | BRANCH 1 | OFFICE | 13:05 | 13:15 | - |
| B | ALLOWED | ALLOWED | VEHICLE TYPE 1 | OFFICE | CUSTOMER 1 | 14:30 | 14:40 | 10 |
| B | ALLOWED | ALLOWED | VEHICLE TYPE 1 | CUSTOMER 1 | OFFICE | 14:50 | 15:00 | - |
| C | ALLOWED | ALLOWED | VEHICLE TYPE 1 | OFFICE | CUSTOMER 2 | 15:45 | 15:55 | 10 |
| C | ALLOWED | ALLOWED | VEHICLE TYPE 1 | CUSTOMER 2 | OFFICE | 16:05 | 16:15 | - |
| . | . | . | . | . | . | . | . | . |

FIG.6

SYSTEM, METHOD, AND COMPUTER READABLE STORAGE MEDIUM

The contents of the following Japanese patent application (s) are incorporated herein by reference:

NO. 2022-155619 filed in JP on Sep. 28, 2022.

TECHNICAL FIELD

The present invention relates to a system, a method, and a computer readable storage medium.

BACKGROUND

Patent document 1 describes a technique of utilizing a storage battery of an electric vehicle as a distributed energy resource in accordance with an operation state of the electric vehicle. Patent document 2 describes an adjustment system for managing lending of an object or a space between users.

PRIOR ART DOCUMENT

Patent Document

Patent Document 1: Japanese Patent Application Publication No. 2022-050126

Patent document 2: International Publication WO 2018/167943

BRIEF DESCRIPTION OF THE DRAWINGS

FIG. 6 illustrates a list of a plurality of pieces of reservation information stored in the integrated management apparatus 50 and the vehicle management apparatus 60, in a tabular form.

DESCRIPTION OF EXEMPLARY EMBODIMENTS

Hereinafter, embodiments of the present invention will be described. However, the following embodiments are not for limiting the invention according to the claims. In addition, not all combinations of features described in the embodiment are essential to the solution of the invention.

Figure 1:
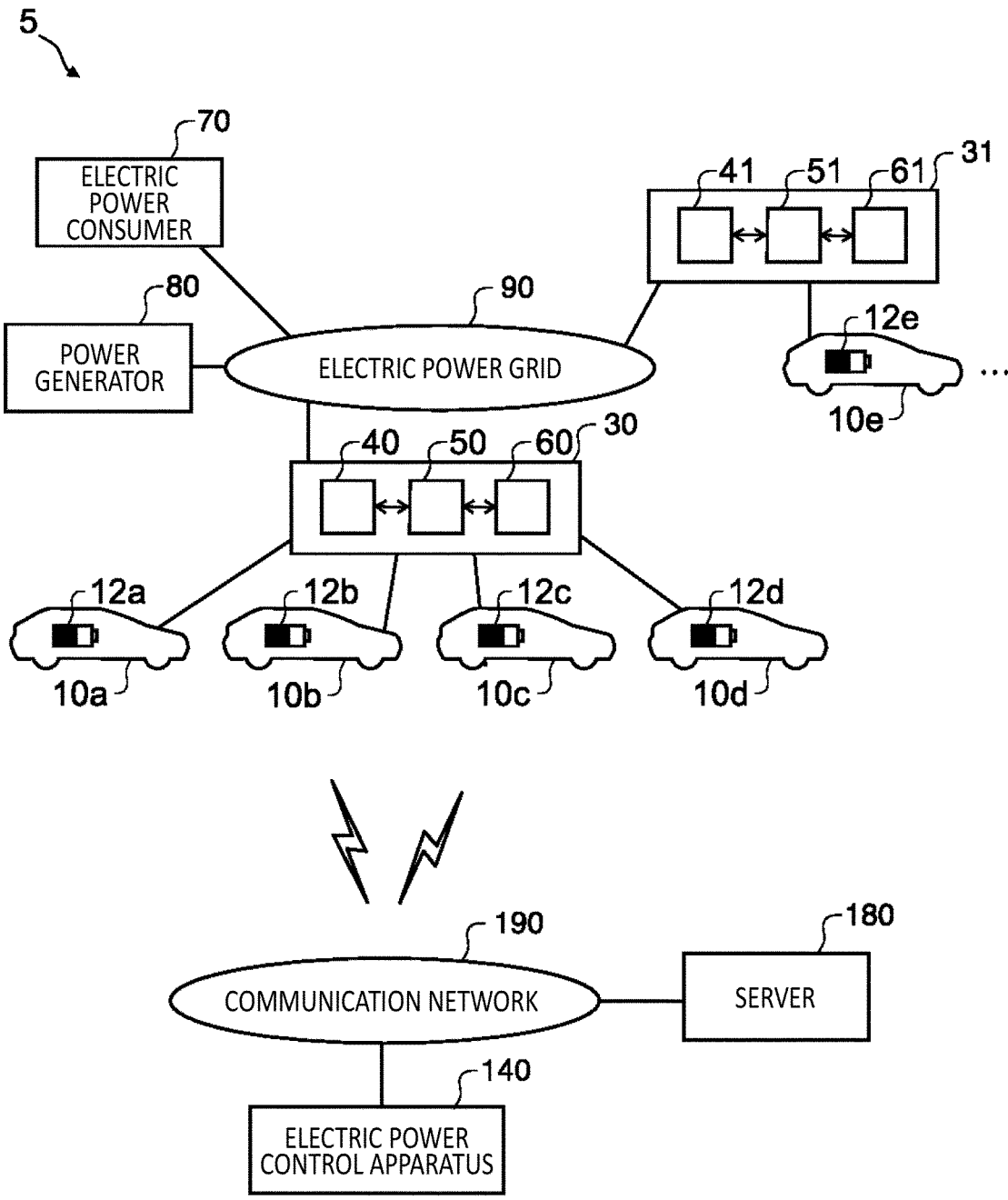
FIG. 1 conceptually illustrates a usage form of a system 5 in an embodiment.

FIG. 1 conceptually illustrates a usage form of a system 5 in an embodiment. The system 5 includes a power generator 80, a plurality of vehicles including a vehicle 10a, a vehicle 10b, a vehicle 10c, a vehicle 10d, and a vehicle 10e, an electric power control apparatus 40 and an electric power control apparatus 41, an integrated management apparatus 50 and an integrated management apparatus 51, a vehicle management apparatus 60 and a vehicle management apparatus 61, an electric power control apparatus 140, and a server 180.

An electric power consumer 70 and the power generator 80 are connected to an electric power grid 90. Electric power generated by the power generator 80 can be supplied to the electric power consumer 70 through the electric power grid 90. The electric power grid 90 is an electric power system, for example.

The vehicle 10a, the vehicle 10b, the vehicle 10c, the vehicle 10d, and the vehicle 10e are electric vehicles including a battery 12a, a battery 12b, a battery 12c, a battery 12d, and a battery 12e which accumulate driving electric power for traveling of the vehicles, respectively. In the present embodiment, in particular, the vehicle 10a, the vehicle 10b, the vehicle 10c, and the vehicle 10d may be collectively referred to as the "vehicle 10", and the battery 12a, the battery 12b, the battery 12c, and the battery 12d may be collectively referred to as the "battery 12".

The vehicle 10 is deployed in an office 30. The office 30 functions as a base for parking of the vehicle 10. The vehicle 10 may be, for example, a vehicle for business use, and may be a vehicle which carries goods such as commercial products handled in the office 30. Electric power is supplied to the office 30 through the electric power grid 90.

The electric power control apparatus 40, the integrated management apparatus 50, and the vehicle management apparatus 60 are provided in the office 30. The vehicle 10 is provided in a manner that communication is allowed with the vehicle management apparatus 60 through a mobile object communication network or the like. The office 30 has a local electric power grid within the office, and is able to perform an electric power delivery with the battery 12 included in the vehicle 10, through a charge and discharge apparatus provided in the office 30. That is, the vehicle 10 can be used for energy management in the office 30. The battery 12 included in the vehicle 10 can perform the electric power delivery with the electric power grid 90 through the electric power grid within the office 30. The electric power control apparatus 40 controls charge and discharge of the vehicle 10 deployed in the office 30 so as to at least satisfy an electric power demand within the office 30.

The electric power control apparatus 40, the integrated management apparatus 50, and the vehicle management apparatus 60 are managed in the office 30, for example. The electric power control apparatus 40 and the integrated management apparatus 50 are provided in a communicable manner by a communication line. The integrated management apparatus 50 and the vehicle management apparatus 60 are provided in a communicable manner by a communication line. The integrated management apparatus 50 and the vehicle management apparatus 60 may be provided outside the office 30. The integrated management apparatus 50 and the vehicle management apparatus 60 may be provided in a communicable manner through a communication line such as the Internet. One or both of the integrated management apparatus 50 and the vehicle management apparatus 60 may be embodied as a server such as a cloud server.

The vehicle management apparatus 60 decides a departure time of the vehicle 10 from the office 30, and a return time of the vehicle 10 to the office 30. The integrated management apparatus 50 adjusts the departure time of the vehicle 10 from the office 30, and the return time of the vehicle 10 to the office 30, so as to satisfy the electric power demand in the office 30. For example, the integrated management apparatus 50 adjusts the departure time of the vehicle 10 from the office 30, and the return time of the vehicle 10 to the office 30, such that peak cut of the electric power demand in the office 30 can be performed. The vehicle management apparatus 60 manages the vehicle 10 based on a schedule of the vehicle 10 adjusted by the integrated management apparatus 50. The electric power control apparatus 40 controls charge and discharge of the battery 12 included in the vehicle 10, based on the schedule of the vehicle 10 adjusted by the integrated management apparatus 50.

The vehicle 10e is deployed in an office 31. The office 31 functions as a base for parking of the vehicle 10e. The vehicle 10e may be a vehicle for business use, and may be a vehicle which carries goods such as commercial products handled in the office 30, as in the case of the vehicle 10. Electric power is supplied to the office 31 through the electric power grid 90. The electric power control apparatus 41, the integrated management apparatus 51, and the vehicle management apparatus 61 are provided in the office 31.

In the office 31, the electric power control apparatus 41, the integrated management apparatus 51, and the vehicle management apparatus 61 correspond to the electric power control apparatus 40, the integrated management apparatus 50, and the vehicle management apparatus 60. The electric power control apparatus 41, the integrated management apparatus 51, and the vehicle management apparatus 61 perform the same control as the electric power control apparatus 40, the integrated management apparatus 50, and the vehicle management apparatus 60 except for the point that a control target and/or a management target are the office 31 and/or the vehicle 10e. Therefore, descriptions for control related to the electric power control apparatus 41, the integrated management apparatus 51, the vehicle management apparatus 61, and the vehicle 10 will be omitted.

The electric power control apparatus 140 communicates with the electric power control apparatus 40 and the electric power control apparatus 41 through a communication network 190, and supervises entire electric power control in the office 30 and the office 31. For example, the electric power control apparatus 140 collects information related to supply and demand of electric power from the electric power control apparatus 40 and the electric power control apparatus 41, and adjusts entire supply and demand of electric power including electric power trading with the electric power grid 90, thereby causing the electric power control apparatus 40 and the electric power control apparatus 41 to perform control so as to minimize an entire electric power cost of the office 30 and the office 31.

The electric power control apparatus 140 is connected to the server 180 through the communication network 190. The server 180 is a server that is used by an electric power aggregator, for example. The server 180 conducts electric power trading in an electric power market. The electric power control apparatus 140 can provide, to the server 180, an electric power resource that gathers and keeps the vehicles deployed in the office 30 and the office 31. The electric power control apparatus 140 provides electric power agreed in the server 180 by controlling charge and discharge of the batteries in the respective vehicles deployed in the office 30 and the office 31 with the electric power control apparatuses 40, 41. For example, the electric power control apparatus 140 controls charge and discharge of the battery 12 with the electric power control apparatus 40 and the electric power control apparatus 41 in accordance with a demand from the server 180, thereby providing electric power in accordance with the demand.

In relation to FIG. 2 to FIG. 7 and the like, control related mainly to the office 30 is described. Specifically, control related to the electric power control apparatus 40, the integrated management apparatus 50, the vehicle management apparatus 60, and the vehicle 10 is described. However, the control related to the office 30 can be applied to control related to the office 31.

Figure 2:
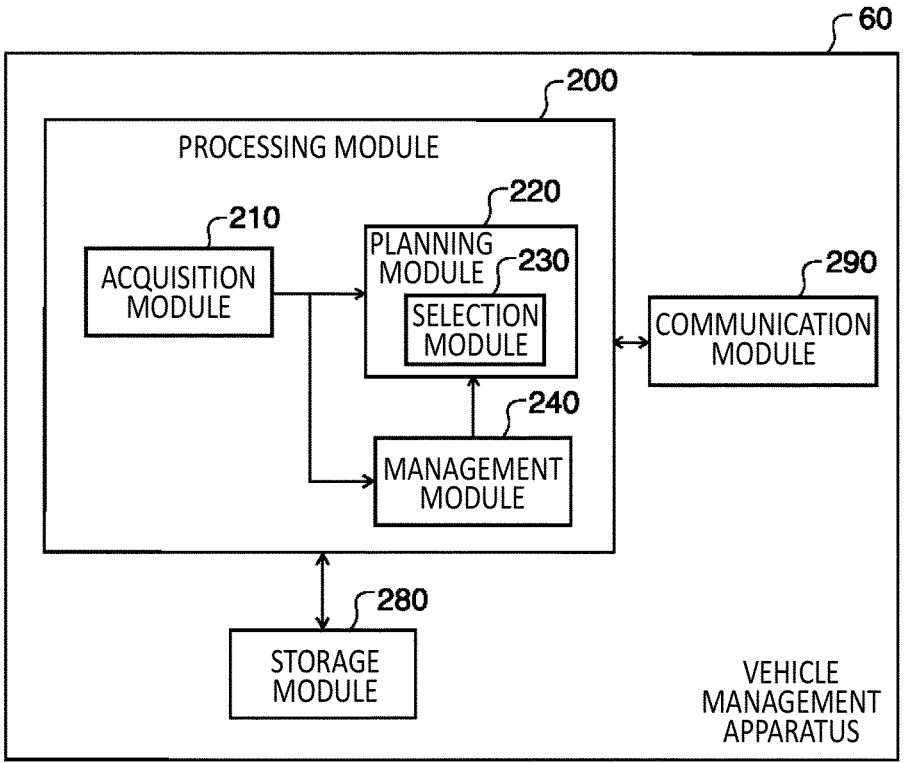
FIG. 2 illustrates an example of a system configuration of a vehicle management apparatus 60.

FIG. 2 illustrates an example of a system configuration of the vehicle management apparatus 60. The vehicle management apparatus 60 includes a processing module 200, a storage module 280, and a communication module 290.

The processing module 200 controls the communication module 290. The communication module 290 carries out communication with the vehicle 10 and the integrated management apparatus 50. The processing module 200 is embodied as an arithmetic processing unit including a processor. Each storage module 280 is embodied by including a non-volatile storage medium. The processing module 200 performs processing by using information stored in the storage module 280. The processing module 200 may be embodied as a microcomputer including a CPU, ROM, RAM, I/O, bus, and the like. The vehicle management apparatus 60 may be embodied as a computer.

In the present embodiment, it is assumed that the vehicle management apparatus 60 is embodied as a single computer. However, in another embodiment, the vehicle management apparatus 60 may be embodied as a plurality of computers. At least some functions of the vehicle management apparatus 60 may be embodied as one or more servers such as a cloud server.

The processing module 200 includes an acquisition module 210, a planning module 220, and a management module 240. The planning module 220 includes a selection module 230.

The acquisition module 210 acquires reservation information for reserving use of the vehicle 10 from among the plurality of vehicles 10. The reservation information includes, for example, a selection condition for selecting the vehicle 10 to be used by a user, and information designating an importance of the selection condition. The selection condition includes, for example, at least one of a condition for selecting a period of use of the vehicle 10 or a condition for selecting a vehicle type. The storage module 280 stores therein reservation information acquired by the acquisition module 210.

The acquisition module 210 further acquires information representing a State Of Charge (SOC) and a deterioration level of the battery 12 included in the vehicle 10. The information representing the deterioration level may be a State Of Health (SOH), for example. As the information representing the deterioration level of the battery 12, an integrated value of a used electrical power amount of the battery 12 and the like can be exemplified besides the SOH.

The planning module 220 makes a use plan of the vehicle 10 based on the reservation information stored in the storage module 280. For example, the planning module 220 creates a vehicle allocation plan representing which user is allowed to use the vehicle 10 based on the selection condition stored in the storage module 280. Specifically, the selection module 230 possessed by the planning module 220 selects the vehicle 10 to be used by the user, thereby creating the vehicle allocation plan.

The management module 240 manages the plurality of vehicles 10 by categorization into a plurality of groups based on combinations of deterioration levels and states of charge of the plurality of batteries included in the plurality of vehicles 10. In the planning module 220, based on the reservation information, the selection module 230 selects the vehicle 10 in which the battery 12 is to be used for an operation, from among the vehicles 10 categorized into a first group of the plurality of groups categorized by the management module 240. At this time, the selection module 230 preferentially selects the vehicle 10 categorized into a group where the deterioration levels are lower, as the vehicle 10 in which the battery 12 is to be used for the operation. For example, the selection module 230 preferentially selects the vehicle 10 categorized into a group where the SOHs are higher, as the vehicle 10 in which the battery 12 is to be used for the operation.

The communication module 290 transmits the vehicle allocation plan to the integrated management apparatus 50. The communication module 290 may further transmit at least a part of the reservation information to the integrated management apparatus 50. As will be described later, when the vehicle 10 to be used by the user has been changed by arbitration of competitive reservations, the communication module 290 may transmit a notification indicating the change of the vehicle 10 to the user for which the changed vehicle 10 had been reserved.

Figure 3:
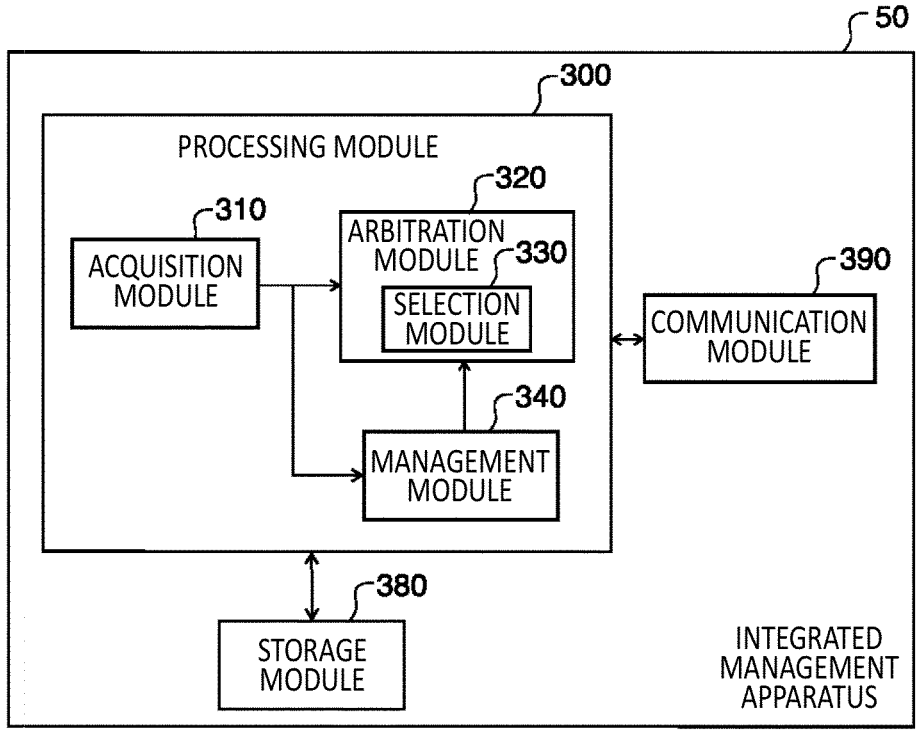
FIG. 3 illustrates an example of a system configuration of an integrated management apparatus 50.

FIG. 3 illustrates an example of a system configuration of the integrated management apparatus 50. The integrated management apparatus 50 includes a processing module 300, a storage module 380, and a communication module 390.

The processing module 300 controls the communication module 390. The communication module 390 carries out communication with the electric power control apparatus 140 and the integrated management apparatus 50. The processing module 300 is embodied as an arithmetic processing unit including a processor. Each storage module 380 is embodied by including a non-volatile storage medium. The processing module 300 performs processing by using information stored in the storage module 380. The processing module 300 may be embodied as a microcomputer including a CPU, ROM, RAM, I/O, bus, and the like. The integrated management apparatus 50 may be embodied as a computer.

In the present embodiment, it is assumed that the integrated management apparatus 50 is embodied by including a single computer. However, in another embodiment, the integrated management apparatus 50 may be embodied as a plurality of computers. At least some functions of the integrated management apparatus 50 may be embodied by including one or more servers such as a cloud server.

The processing module 300 includes an acquisition module 310, an arbitration module 320, and a management module 340. The arbitration module 320 includes a selection module 330.

The management module 340 manages the plurality of vehicles 10 by categorization into a plurality of groups based on combinations of deterioration levels and states of charge of the plurality of batteries 12 included in the plurality of vehicles 10. Based on electric power supply/demand information in an electric power grid, the selection module 330 selects, from among the vehicles 10 categorized into a particular group of the plurality of groups, the vehicle 10 in which the battery 12 is to be used for the electric power delivery to/from the electric power grid. The electric power grid is, for example, an electric power grid within the office 30 and/or the electric power grid 90. The electric power supply/demand information in the electric power grid 90 may be, as an example, information related to an increase demand response (DR), a decrease DR, and the like.

The management module 340 manages the vehicles 10 by categorization into the plurality of groups based on the combinations of the deterioration levels and the states of charge of the batteries 12, thereby being able to reduce an arithmetic operation load for dealing with supply and demand of electric power in the electric power grid while taking into consideration deterioration of the batteries 12.

The selection module 330 preferentially selects the vehicle 10 categorized into a group where the deterioration levels are lower, as the vehicle 10 in which the battery 12 is to be used for the electric power delivery. Specifically, when there is a need to supply electric power to the electric power grid from the battery 12, the selection module 330 preferentially selects the vehicle 10 categorized into a group where the deterioration levels are lower and the states of charge are higher, as the vehicle 10 in which the battery 12 is to be used for the electric power delivery. On the other hand, when there is a need to supply electric power to the battery 12 from the electric power grid, the selection module 330 preferentially selects the vehicle 10 categorized into a group where the deterioration levels are lower and the states of charge are lower, as the vehicle 10 in which the battery 12 is to be used for the electric power delivery.

The acquisition module 310 acquires reservation information for reserving use of the vehicle 10 from among the plurality of vehicles 10. The reservation information includes information representing whether the battery 12 in the vehicle 10 is to be used for either of (i) the electric power delivery to/from the electric power grid or (ii) the operation of the vehicle 10. The acquisition module 310 may acquire the reservation information for the electric power delivery to/from the electric power grid from the electric power control apparatus 40. The acquisition module 310 may acquire the reservation information for the operation of the vehicle 10 from the vehicle management apparatus 60. For example, the acquisition module 310 may acquire the reservation information for the operation of the vehicle 10 through the vehicle management apparatus 60 and the communication module 390.

Based on the reservation information, the selection module 330 selects, from among the vehicles 10 categorized into a first group of the plurality of groups, the vehicle 10 in which the battery 12 is to be used for the electric power delivery to/from the electric power grid. On the other hand, in the vehicle management apparatus 60, the selection module 230 selects, from among the vehicles 10 categorized into a second group of the plurality of groups, the vehicle 10 in which the battery 12 is to be used for the operation of the vehicle 10. The second group is a group where the deterioration levels are lower than the first group. In other words, the selection module 230 selects the vehicle 10 in which the deterioration level of the battery 12 is relatively low, as the vehicle 10 to be used for the operation, and the selection module 330 selects the vehicle 10 in which the deterioration level of the battery 12 is relatively high, as the vehicle 10 in which the battery 12 is to be used for the electric power delivery to/from the electric power grid. As compared to when the battery 12 is to be used for the electric power delivery to/from the electric power grid, there is a large load on the battery 12 when the vehicle 10 travels and deterioration of the battery 12 is often progressed. Accordingly, it is possible to prevent progress of deterioration of the battery 12 in a particular one of vehicle 10 by selecting the vehicle 10 including the battery 12 having the relatively low deterioration level as the vehicle 10 to be used for the operation, and selecting the vehicle 10 including the battery 12 having the relatively high deterioration level as the vehicle 10 in which the battery 12 is to be used for the electric power delivery to/from the electric power grid.

Figure 4:
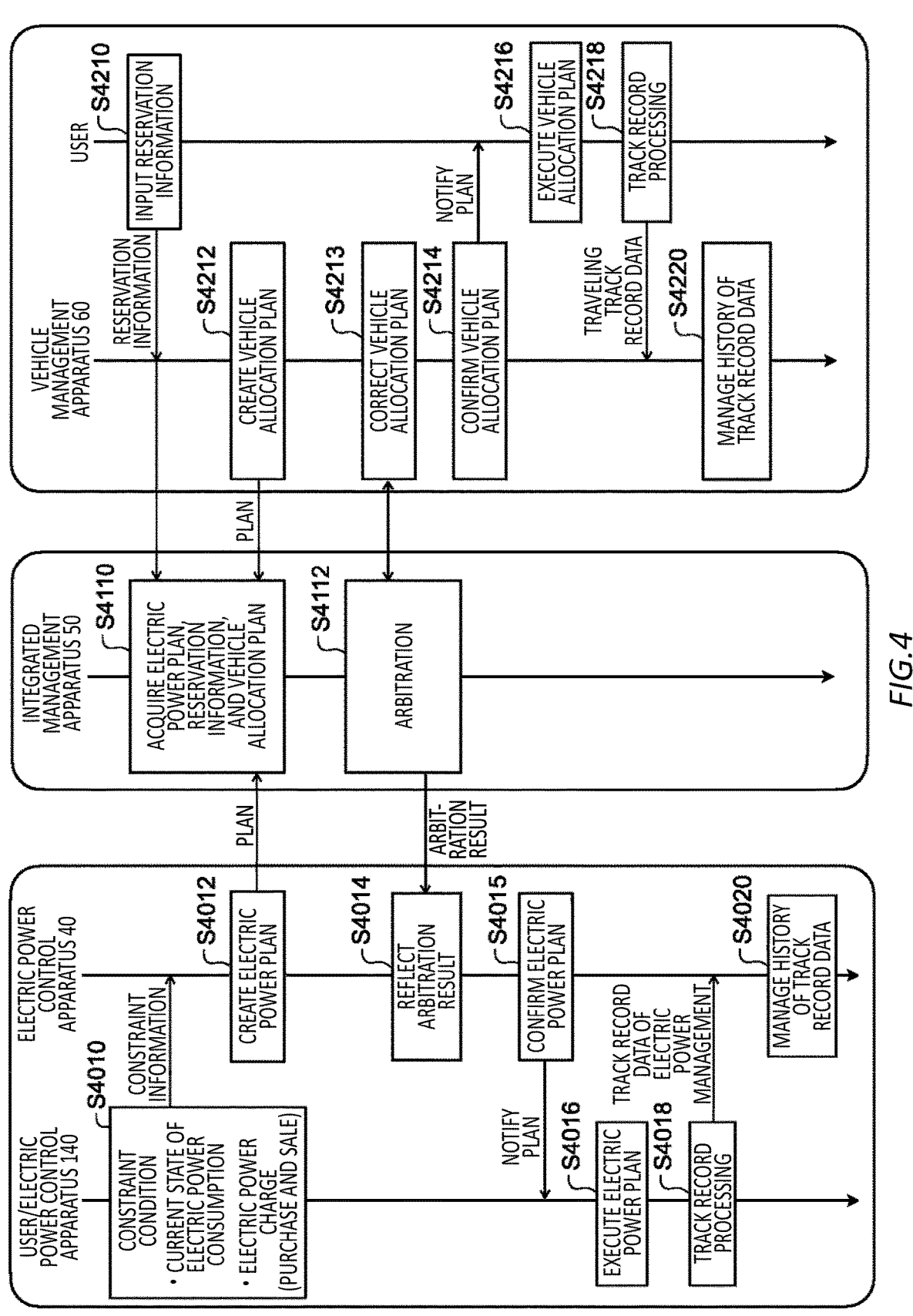
FIG. 4 illustrates an execution sequence of an electric power control apparatus 40, the integrated management apparatus 50, and the vehicle management apparatus 60.

FIG. 4 illustrates an execution sequence of the electric power control apparatus 40, the integrated management apparatus 50, and the vehicle management apparatus 60. The processing in FIG. 4 represents a processing of creating an electric power plan and a vehicle allocation plan of the next day, on the previous day, and executing various types of control according to the created plans.

As control related to the electric power control apparatus 40, in S4010, at least either of a user of the electric power control apparatus 40 or the electric power control apparatus 140 sets a constraint condition related to the electric power plan in the office 30, and makes a notification to the electric power control apparatus 40. The electric power control apparatus 140 may set the constraint condition in the office 30 so as to minimize an entire electric power cost in the office 30 and the office 31. Note that, the user is a person or a system inputting information related to an electric power management in the office 30 to the electric power control apparatus 40. The constraint condition is a condition that becomes a constraint when creating the electric power plan. The constraint condition may include a constraint that is required for satisfying an electric power demand. The constraint condition includes, for example, information related to a current state of a power generation amount, a current state of an electric power consumption, and an electric power charge. The power generation amount is, for example, a power generation amount in the power generator 80. The electric power consumption is an electric power consumption in the office 30. The electric power charge includes an electric power purchase price and an electric power selling price. The electric power purchase price is a condition related to a price that is charged as a consideration for electric power received by the office 30 from the electric power grid 90, for example. The electric power selling price is a condition related to a price that is obtained as a consideration for electric power supplied to the electric power grid 90 from the office 30, for example.

In S4012, the electric power control apparatus 40 creates an electric power plan of the next day in the office 30. The electric power plan includes a power consumption for each time period in a day. An amount of electric power to be consumed in each time period in the office 30 is determined in accordance with the electric power plan. The power consumption for each time period of the next day may be predicted from environmental information such as weather information of the next day and track record data in the past. The electric power plan may include peak shaving information for performing peak shaving. The peak shaving information may include information representing an amount of consumed electric power that should be suppressed, and in which time period the consumed electric power should be suppressed, in the office 30. The peak shaving information may include information representing an amount of electric power that should be received from an outside, and in which time period the electric power should be received, in the office 30.

The electric power control apparatus 40 may create an optimal electric power plan in the office 30. For example, the electric power control apparatus 40 may create the electric power plan so as to minimize the amount of electric power received from the electric power grid 90 in the office 30. The electric power control apparatus 40 may create the electric power plan so as to minimize the price to be charged as a consideration for electric power received from the electric power grid 90 in the office 30. The electric power control apparatus 40 may create the electric power plan so as to maximize the price to be obtained as a consideration for electric power supplied to the electric power grid 90 in the office 30. In this manner, the electric power control apparatus 40 creates the optimal electric power plan as the electric power plan of the next day in the office 30, based on the constraint condition. An amount of electric power that is needed to be received from the outside in each time period of the next day is determined in accordance with this electric power plan. The amount of electric power which is needed to be received from the outside may be supplied from the battery 12 included in the vehicle 10 parking in the office 30. The electric power control apparatus 40 transmits the created electric power plan to the integrated management apparatus 50.

As control related to the vehicle management apparatus 60, in S4210, the user inputs reservation information related to vehicle allocation of the vehicle 10. The content of the reservation information is specifically described in relation to FIG. 6. The user of the vehicle management apparatus 60 is a person, a system, or the like using the vehicle 10. The reservation information includes a condition that may become a constraint when creating the vehicle allocation plan. The reservation information includes, for example, a departure place and a destination, a departure time and an arrival time in the destination, and a type, a capacity, a weight, and the like of a loaded object in the vehicle 10. From which location and to which location the vehicle 10 is needed to be traveled are determined in accordance with the departure place and the destination. The departure time may be, for example, a time at which the vehicle 10 departs from the office 30, and the arrival time may be, for example, a time at which the vehicle 10 returns to the office 30. A time adjustment allowance representing an allowable time change in the departure time and/or the arrival time of the vehicle 10 may be set for the departure time and the arrival time. The reservation information input in S4210 is transmitted to the vehicle management apparatus 60, and is also transmitted to the integrated management apparatus 50 through the vehicle management apparatus 60.

In S4212, the planning module 220 of the vehicle management apparatus 60 creates the vehicle allocation plan of the next day in the office 30 based on the constraint condition notified from the user. For example, the planning module 220 decides the vehicle 10 to be used for transportation of a person or a loaded object, a traveling route of the vehicle 10, and a traveling speed of the vehicle 10 so as to satisfy a transportation demand determined by the reservation information. The vehicle management apparatus 60 transmits the created vehicle allocation plan to the integrated management apparatus 50. At this time, the vehicle management apparatus 60 transmits information representing the SOC and the SOH of the battery 12 in the vehicle 10 to the integrated management apparatus 50 together with the vehicle allocation plan.

In S4110, the acquisition module 310 of the integrated management apparatus 50 acquires the electric power plan transmitted from the electric power control apparatus 40 and the reservation information and the vehicle allocation plan transmitted from the vehicle management apparatus 60.

In S4112, the arbitration module 320 of the integrated management apparatus 50 judges whether the electric power plan in the office 30 is satisfied when the vehicle 10 is operated according to the vehicle allocation plan. For example, a period in which the vehicle 10 is predicted to be present in the office 30 is determined from the vehicle allocation plan. The arbitration module 320 judges that the electric power plan is satisfied when, in a period where the office 30 is needed to be supplied electric power from the outside, it is predicted that electric power can be received from the battery 12 included in the vehicle 10 present in the office 30 in that period.

When it is judged that the electric power plan cannot be satisfied at the time of a vehicle allocation according to the vehicle allocation plan, the arbitration module 320 judges how to correct the vehicle allocation plan to satisfy the electric power plan. For example, the arbitration module 320 decides an adjustment amount of the departure time and the arrival time of the vehicle 10 in the vehicle allocation plan.

The integrated management apparatus 50 transmits correction information including the decided adjustment amount of the departure time and the return time to the vehicle management apparatus 60. Once receiving the correction information from the integrated management apparatus 50, the planning module 220 of the vehicle management apparatus 60 corrects the vehicle allocation plan created in S4212 based on the correction information (S4213). For example, the planning module 220 corrects the vehicle allocation plan so as to satisfy the reservation information based on the adjustment amount of the departure time and the return time received from the integrated management apparatus 50. The vehicle management apparatus 60 transmits a correction result of the vehicle allocation plan to the integrated management apparatus 50. The integrated management apparatus 50 and the vehicle management apparatus 60 decide a performable vehicle allocation plan by repeating the processings of S4112 and S4213. In S4213, the planning module 220 decides an operation route of the vehicle 10, and determines whether the departure time and the arrival time designated in the reservation information can be observed and whether the vehicle 10 can return to the office 30 without causing running out of electric power based on the SOC and an electric power consumption rate of the vehicle 10, thereby deciding the performable vehicle allocation plan. In addition, in S4112, the arbitration module 320 may determine that the vehicle allocation plan is performable on the condition that it is judged that a benefit can be gained as a whole by taking into consideration an electric power cost reduction amount of the office 30 that can be obtained when performing the electric power delivery between the battery 12 and the office 30 according to the decided electric power plan, and an operation cost of the vehicle 10 and a working rate of the vehicle 10 that are needed when performing the operation of the vehicle 10 according to the vehicle allocation plan.

Once the vehicle allocation plan has been decided, an arbitration result including the vehicle allocation plan is transmitted to the electric power control apparatus 40. Upon receiving the arbitration result from the integrated management apparatus 50, the electric power control apparatus 40 reflects this in the electric power plan based on the arbitration result (S4014), and notifies the user of the electric power plan which is confirmed by reflecting the arbitration result (S4015). In S4016, the user and the electric power control apparatus 140 execute control according to the notified electric power plan. In S4018, the user and the electric power control apparatus 140 perform track record processing related to the execution of the electric power plan. For example, the user performs processing of collecting and inputting track record data of an electric power management including track record data of the power consumption in each time period. In S4020, the electric power control apparatus 40 manages track record data input from each of the user and the electric power control apparatus 140 as history information. Note that, the electric power control apparatus 40 may use the history information managed by the electric power control apparatus 40 when creating an electric power plan later.

The vehicle management apparatus 60 confirms (S4214) the vehicle allocation plan finally decided in S4213, and notifies the user of the confirmed vehicle allocation plan through the communication module 290. In S4216, the user executes operation control of the vehicle 10 according to the notified vehicle allocation plan. In S4218, the user performs track record processing related to the execution of the vehicle allocation plan. For example, the user performs processing of collecting and inputting traveling track record data including traveling data of each vehicle 10, a remaining capacity of the battery 12, and the like. In S4220, the vehicle management apparatus 60 manages the traveling track record data input from the user as the history information. Note that, the vehicle management apparatus 60 may use the history information managed by the vehicle management apparatus 60 when creating a vehicle allocation plan later.

Figure 5:
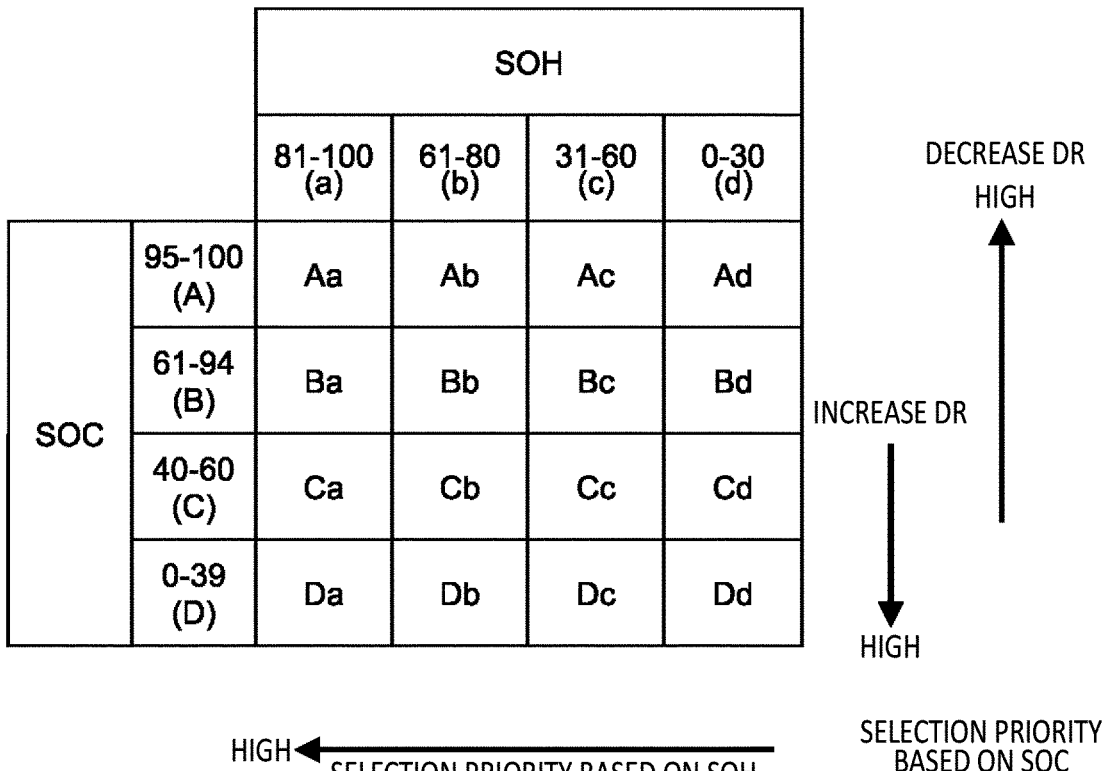
FIG. 5 illustrates groups categorized based on combinations of SOCs and SOHs of a battery 12.

FIG. 5 illustrates groups categorized based on combinations of SOCs and SOHs of the battery 12.

The management module 240 and the management module 340 manage the vehicle 10 by categorization into four groups from Group A to Group D based on the SOCs of the battery 12. Specifically, Group A is a group where the SOC is 95% or more and 100% or less. Group B is a group where the SOC is 61% or more and 94% or less. Group C is a group where the SOC is 40% or more and 60% or less. Group D is a group where the SOC is 39% or less.

The management module 240 and the management module 340 manage the vehicle 10 by categorization into four groups from Group a to Group d based on the SOHs of the battery 12. Group a is a group where the SOH is 81% or more and 100% or less. Group b is a group where the SOH is 61% or more and 80% or less. Group c is a group where the SOH is 31% or more and 60% or less. Group d is a group where the SOH is 30% or less.

The management module 240 and the management module 340 manage the vehicle 10 by categorization into any of sixteen groups based on the combination of a group to which the SOC of the battery 12 belongs and a group to which the SOH of the battery 12 belongs. As an example, the vehicle 10 including the battery 12 in which the SOC is within the range of Group B and the SOH is within the range of Group a is categorized into Group Ba. The vehicle 10 including the battery 12 in which the SOC is within the range of Group B and the SOH is within the range of Group b is categorized into group Bb.

When selecting the vehicle 10 to be used for the electric power delivery to/from the office 30 or the vehicle 10 to be operated, the selection module 230 and the selection module 330 preferentially select this from the vehicle 10 categorized into groups where the SOHs are higher. In other words, when selecting the vehicle 10 to be used for the electric power delivery to/from the office 30 or the vehicle 10 to be operated, the selection module 230 and the selection module 330 preferentially select this from the vehicle 10 having a higher SOH. That is, as illustrated in FIG. 5, a selection priority based on the SOH becomes higher in higher SOHs.

As an example, the selection module 230 may select the vehicle 10 to be used for the operation from among the vehicles 10 categorized into groups where the SOHs are 31% or more. In other words, the selection module 230 may select the vehicle 10 to be used for the operation from among the vehicles 10 categorized into groups other than Group Ad, Group Bd, Group Cd, and Group Dd.

When selecting the vehicle 10 to be used for the electric power delivery to/from the office 30 based on a decrease demand response (DR), the selection module 330 preferentially selects the vehicle 10 to be used for the electric power delivery from among the vehicles 10 categorized into groups having higher SOCs. In other words, when selecting the vehicle 10 to be used for the electric power delivery to/from the office 30 based on the decrease DR, the selection module 330 preferentially selects the vehicle 10 having a higher SOC. That is, as illustrated in FIG. 5, a selection priority based on the SOC becomes higher in higher SOCs. Note that, when selecting the vehicle 10 to be used for the electric power delivery to/from the office 30 based on the decrease DR, the selection module 330 does not select the vehicle 10 belonging to Group D as the vehicle 10 to be used for the electric power delivery to/from the office 30.

In this manner, when selecting the vehicle 10 to be used for the electric power delivery to/from the office 30 based on the decrease DR, the selection module 330 may select this from among the vehicles 10 categorized into groups where the SOCs are 40% or more. In other words, the selection module 330 may select the vehicle 10 to be used for the electric power delivery from among the vehicles 10 categorized into groups other than Group Da, Group db, Group Dc, and Group Dd.

When selecting the vehicle 10 to be used for the electric power delivery to/from the office 30 based on an increase DR, the selection module 330 preferentially selects the vehicle 10 to be used for the electric power delivery from among the vehicles 10 categorized into groups having lower SOCs. In other words, when selecting the vehicle 10 to be used for the electric power delivery to/from the office 30 based on the increase DR, the selection module 330 preferentially selects the vehicle 10 having a lower SOC. That is, as illustrated in FIG. 5, a selection priority based on the SOC becomes higher in lower SOCs. Note that, when selecting the vehicle 10 to be used for the electric power delivery to/from the office 30 based on the increase DR, the selection module 330 does not select the vehicle 10 belonging to either of Group A or Group B as the vehicle 10 to be used for the electric power delivery to/from the office 30.

In this manner, when selecting the vehicle 10 to be used for the electric power delivery to/from the office 30 based on the increase DR, the selection module 330 may select this from among the vehicles 10 categorized into groups where the SOCs are 60% or less. In other words, the selection module 330 may select the vehicle 10 to be used for the electric power delivery from among the vehicles 10 categorized into Group Ca, Group Cb, Group Cc, Group Cd, Group Da, Group db, Group Dc, or Group Dd.

FIG. 6 illustrates a list of a plurality of pieces of reservation information stored in the integrated management apparatus 50 and the vehicle management apparatus 60, in a tabular form. Each reservation information includes information representing a "user", a "time change", a "change in the vehicle type", a "designation of the vehicle type", a "departure place", a "destination", a "departure time", an "arrival time", and a "staying time". Among the information included in the reservation information, the "designation of the vehicle type", the "departure place", the "destination", the "departure time", the "arrival time", and the "staying time" are examples of the selection condition of the vehicle 10 to be used by the user. The "time change" and the "change in the vehicle type" are examples of information designating an importance of the selection condition.

The "user" is identification information on the person who will use the vehicle 10.

The "time change" is information representing whether a change in the selection condition related to a period of use is allowed. The selection condition related to the period of use includes the "departure time", the "arrival time", and the "staying time" which will be described below. "Not allowed" of the "time change" represents that a change in the selection condition related to the period of use is not allowed. "Allowed" of the "time change" represents that a change in the selection condition related to the period of use is allowed. The "time change" is an example of information designating an importance of the selection condition related to the period of use.

The "change in the vehicle type" is information representing whether a change in the selection condition related to the type (vehicle type) of the vehicle to be used is allowed. The selection condition related to the vehicle type includes the "designation of the vehicle type", which will be described below. "Not allowed" of the "change in the vehicle type" represents that a change in the selection condition related to the vehicle type is not allowed. "Allowed" of the "change in the vehicle type" represents that a change in the selection condition related to the vehicle type is allowed. The "change in the vehicle type" is an example of information designating an importance of the selection condition related to the vehicle type.

The "designation of the vehicle type" is designated when there is a desire to use a particular vehicle type of the vehicle. The "designation of the vehicle type" is identification information of the vehicle type.

The "departure place" represents a departure place of the vehicle 10. The "destination" represents a destination of the vehicle 10.

The "departure time" is a time at which the vehicle 10 is scheduled to depart from the departure place. The "arrival time" is a time at which the vehicle 10 is scheduled to arrive in the destination. The "staying time" represents a length of a staying time of the vehicle 10 in the destination. As an example, regarding the "staying time" in FIG. 6, the length of the staying time in the destination is shown in minutes. The reservation information when the destination is the office 30 does not include the "staying time".

In the example of FIG. 6, according to the reservation information of a user A, a reservation is made for use of the vehicle 10 to depart from a business office at 12:45 and arrive at a location of a branch 1 at 12:55, and then stay at the location of the branch 1 for 10 minutes, depart from the location of the branch 1 at 13:05, and arrive at the office 30 at 13:15. In this reservation, it is designated that the time change and the change in the vehicle type are allowed.

In the example of FIG. 6, according to the reservation information of a user B, a reservation is made for use of the vehicle 10 to depart from a business office at 14:30 and arrive at a location of a customer 1 at 14:40, and then stay at the location of the customer 1 for 10 minutes, depart from the location of the customer 1 at 14:50, and arrive at the office 30 at 15:00. In this reservation, it is designated that the time change and the change in the vehicle type are allowed.

In the example of FIG. 6, according to the reservation information of a user C, a reservation is made for use of the vehicle 10 to depart from a business office at 15:45 and arrive at a location of a customer 2 at 15:55, and then stay at the location of the customer 2 for 10 minutes, depart from the location of the customer 2 at 16:05, and arrive at the office 30 at 16:15. In this reservation, it is designated that the time change and the change in the vehicle type are allowed.

When a competition arises in reservations, the arbitration module 320 arbitrates the competitive reservations based on the reservation information. For example, the arbitration module 320 adjusts the competitive reservations by adjusting the departure time and the arrival time. In addition, the selection module 330 of the arbitration module 320 adjusts the competitive reservations by selecting another vehicle 10 to be used by the user. As the selection condition, the reservation information may further include information representing the time adjustment allowance representing an allowable time change in the departure time and/or the arrival time. The arbitration module 320 may adjust the competitive reservations by adjusting the departure time and/or the arrival time within a range of the time adjustment allowance.

Figure 7:
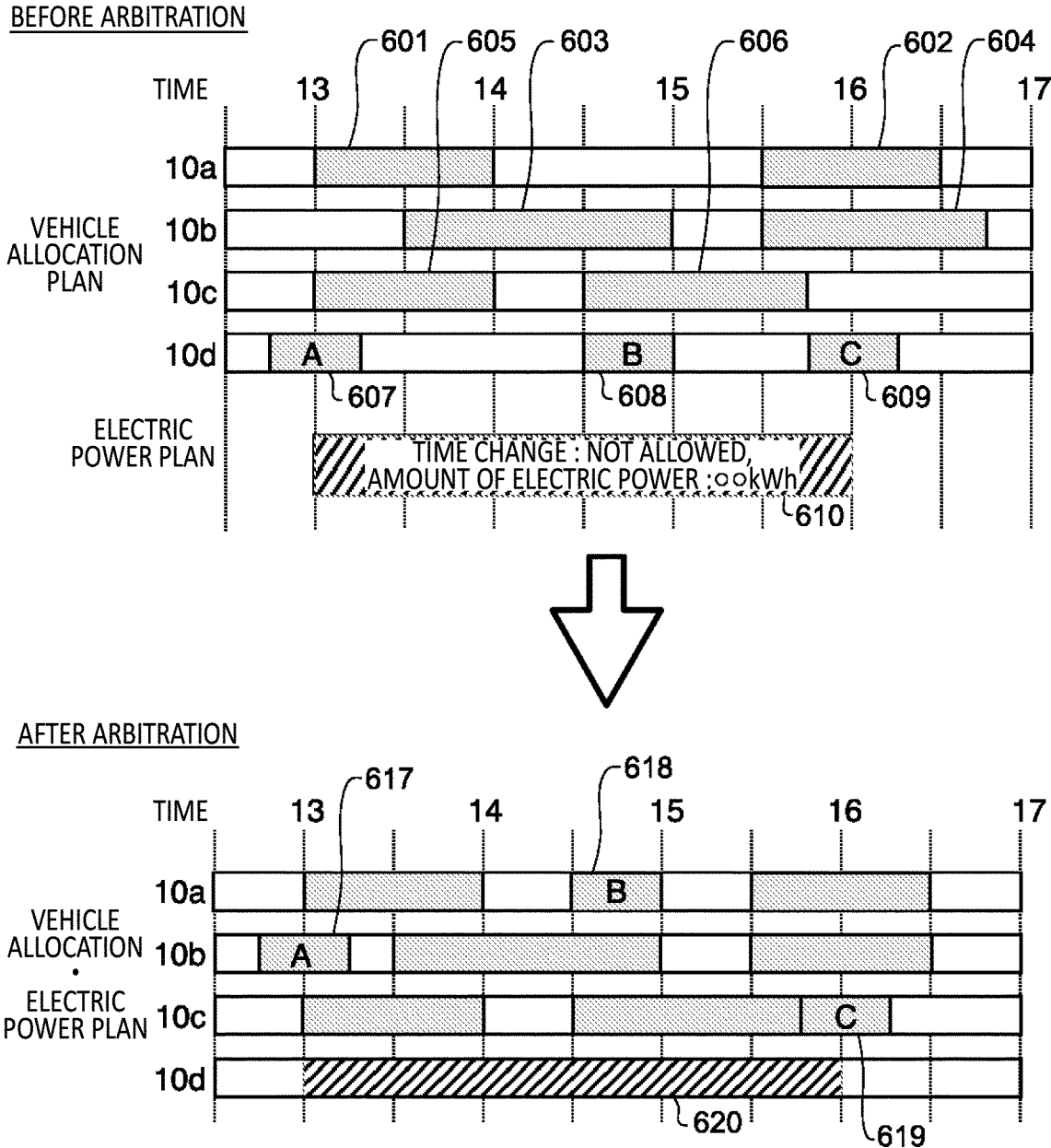
FIG. 7 illustrates a vehicle allocation plan and an electric power plan before an arbitration, and the vehicle allocation plan and the electric power plan after the arbitration.

FIG. 7 illustrates the vehicle allocation plan and the electric power plan before an arbitration, and the vehicle allocation plan and the electric power plan after the arbitration.

It is assumed that the vehicle 10a, the vehicle 10b, and the vehicle 10c are categorized into Group Ba, and the vehicle 10d is categorized into group Bb. The selection module 230 selects the vehicle 10a, the vehicle 10b, and the vehicle 10c categorized into Group Ba as the vehicle 10 to be operated for a relatively long period, and selects the vehicle 10d as the vehicle 10 to be operated for a relatively short period. In this manner, the selection module 230 selects the vehicle 10 having a higher SOH as the vehicle 10 to be operated for a longer period.

As a result, as illustrated in FIG. 7, in the vehicle allocation plan before an arbitration created by the vehicle management apparatus 60, the vehicle 10a is planned to be used in a period from 13:00 to 14:00 and a period from 15:30 to 16:30 as shown with a sign 601 and a sign 602. Furthermore, as shown with a sign 603 and a sign 604, the vehicle 10b is planned to be used in a period from 13:30 to 15:00 and a period from 15:30 to 16:45. Furthermore, as shown with a sign 605 and a sign 606, the vehicle 10c is planned to be used in a period from 13:00 to 14:00 and a period from 14:30 to 15:45. Furthermore, as shown with a sign 607, a sign 608, and a sign 609, the vehicle 10d is planned to be used in a period from 12:45 to 13:15, a period from 14:30 to 15:00, and a period from 15:45 to 16:15.

As shown with a sign 610 in FIG. 7, in the electric power plan created by the electric power control apparatus 40, it is planned that the battery 12 is to be used for electric power supply to the office 30 for peak cut of the office 30 in a period from 13:00 to 16:00. For the vehicle 10 of any of the vehicle 10a, the vehicle 10b, the vehicle 10c or the vehicle 10d, a reservation based on the electric power plan and a reservation based on the vehicle allocation plan are competitive. Therefore, the arbitration module 320 arbitrates the reservation based on the electric power plan and the reservation based on the vehicle allocation plan as below.

As the selection condition for selecting the vehicle 10 to be used other than the period of use, it is assumed that the electric power plan is set such that an amount of electric power to be supplied from the battery 12 is designated, and a change in a time for using the vehicle 10 is not allowed (time change: not allowed). In this case, on the condition that a designated amount of electric power can be supplied from the battery 12d of the vehicle 10d in a designated period, the selection module 330 of the arbitration module 320 selects the vehicle 10d categorized into Group Bb as the vehicle 10 to be used for the electric power delivery to/from the office 30, and judges that the vehicle 10a, the vehicle 10b, and the vehicle 10c categorized into Group Ba are the vehicle 10 to be used for the operation.

As illustrated in FIG. 6, a change in the vehicle type is allowed in the reservations by the user A, the user B, and the user C on the vehicle 10d. Since the vehicle 10b is not reserved in a period from 12:45 to 13:15, the arbitration module 320 judges that a vehicle to be used by the user A in the period from 12:45 to 13:15 can be changed to the vehicle 10b. Similarly, since the vehicle 10a is not reserved in a period from 14:30 to 15:00, the arbitration module 320 judges that a vehicle to be used by the user B in the period from 14:30 to 15:00 can be changed to the vehicle 10a. Similarly, since the vehicle 10c is not reserved in a period from 15:45 to 16:15, the arbitration module 320 judges that a vehicle to be used by the user C in the period from 15:45 to 16:15 can be changed to the vehicle 10c.

Thus, the arbitration module 320 changes the vehicle to be used to the vehicle 10b as shown with a sign 617 for the reservation by the user A on the vehicle 10d, changes the vehicle to be used to the vehicle 10a as shown with a sign 618 for the reservation by the user B on the vehicle 10d, and changes the vehicle to be used to the vehicle 10c as shown with a sign 619 for the reservation by the user C on the vehicle 10d. The selection module 330 selects the vehicle 10d as a vehicle for supplying electric power to the office 30 based on the electric power plan in a period from 13:00 to 16:00 as shown with a sign 620. Through the communication module 290 of the vehicle management apparatus 60, the user A, the user B, and the user C are notified of a change in the vehicle to be used to the vehicle 10b, the vehicle 10a, and the vehicle 10c, respectively. In this way, the battery 12 in the vehicle 10 can be effectively used for peak cut of the office 30 in a range that is allowed by the user A, the user B, and the user C.

According to the system 5 in the present embodiment, the vehicle 10 to be used can be selected by taking into consideration the SOHs. In particular, since the vehicle 10 having a high SOH can be preferentially used, it is possible to prevent progress of deterioration only in the battery 12 of a particular one of the vehicle 10. Furthermore, since a vehicle having a high SOH is preferentially used, the SOHs are naturally lowered, and priorities of use are accordingly lowered. In this way, deterioration of the battery 12 can be lowered relatively uniformly throughout the plurality of vehicles 10. Consequently, it is possible to prevent shortening in the life of a particular one of the vehicle 10, while also facilitating management of a maintenance interval of the plurality of vehicles 10.

Figure 8:
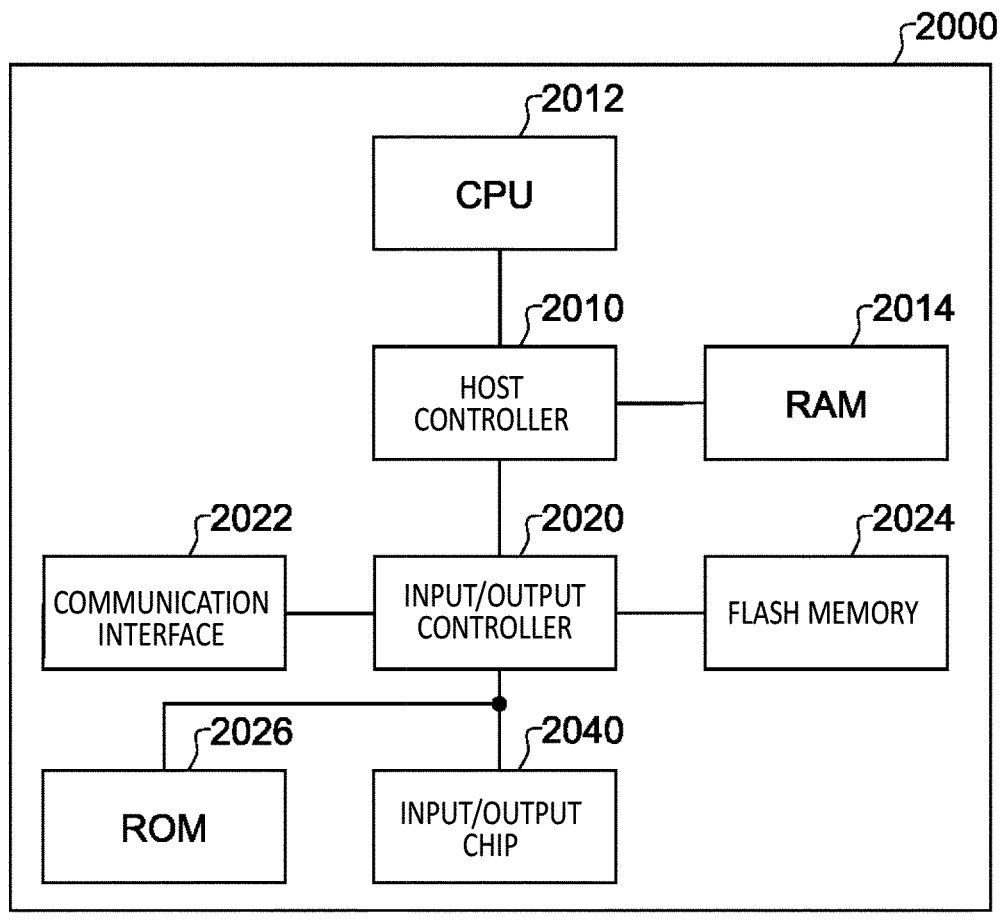
FIG. 8 illustrates an example of a computer 2000.

FIG. 8 illustrates an example of a computer 2000 where a plurality of embodiments of the present invention may be entirely or partially embodied. A program installed in the computer 2000 can cause the computer 2000 to function as the system 5 according to an embodiment or each module of the system 5, or an apparatus such as the electric power control apparatus 40 or the vehicle management apparatus 60 or each module of the apparatus, execute operations associated with the system, each module of the system, the apparatus, or each module of the apparatus, and/or execute a process according to an embodiment or a step of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040.

The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer readable storage medium such as a CD-ROM, a DVD-ROM, or a memory card. The RAM 2014, the ROM 2026, or the flash memory 2024 is an example of the computer readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources described above. A device or a method may be actualized by executing operations or processing of information depending on a use of the computer 2000.

For example, when communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and write back a result into the RAM 2014. In addition, the CPU 2012 may search for information in a file, a database, or the like in the recording medium. For example, when multiple entries, each having an attribute value of a first attribute associated with an attribute value of a second attribute, is stored in the recording medium, the CPU 2012 may search for an entry having a designated attribute value of the first attribute that matches a condition from the multiple entries, and read the attribute value of the second attribute stored in the entry, thereby obtaining the attribute value of the second attribute associated with the first attribute that satisfies a predefined condition.

The programs or software modules explained above may be stored in the computer readable storage medium on the computer 2000 or in the vicinity of the computer 2000. A recording medium such as a hard disk or a RAM provided in a server system connected to a dedicated communication network or the Internet can be used as the computer readable storage medium. A program stored in the computer readable storage medium may be provided to the computer 2000 via a network.

The program installed in the computer 2000 to cause the computer 2000 to function as the integrated management apparatus 50 may work on the CPU 2012 or the like to cause the computer 2000 to function as each module of the integrated management apparatus 50. The information processing described in these programs is read by the computer 2000 to function as each module of the integrated management apparatus 50 which is a specific means in which software and the above-described various hardware resources cooperate. Then, when calculation or processing of information in accordance with the use purpose of the computer 2000 in the present embodiment is realized by these specific means, the unique integrated management apparatus 50 in accordance with the use purpose is constructed.

The program installed in the computer 2000 to cause the computer 2000 to function as the vehicle management apparatus 60 may work on the CPU 2012 or the like to cause the computer 2000 to function as each module of the vehicle management apparatus 60. The information processing described in these programs is read by the computer 2000 to function as each module of the vehicle management apparatus 60 which is a specific means in which software and the above-described various hardware resources cooperate. Then, when arithmetic operation or processing of information in accordance with the use purpose of the computer 2000 in the present embodiment is realized by these specific means, the unique vehicle management apparatus 60 in accordance with the use purpose is constructed.

Various embodiments have been explained with reference to the block diagrams and the like. In the block diagrams, each block may represent (1) a stage of a process in which an operation is executed, or (2) each module of the device having a role in executing the operation. A specific stage and module may be implemented by a dedicated circuit, a programmable circuit supplied with computer readable instructions stored on a computer readable storage medium, and/or a processor supplied with computer readable instructions stored on a computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer readable storage medium may include any tangible device capable of storing instructions to be executed by an appropriate device. Thereby, the computer readable storage medium having instructions stored therein forms at least a part of a product including instructions which can be executed to provide means for executing processing procedures or operations specified in the block diagrams. Examples of the computer readable storage medium may include an electronic storage medium, a magnetic storage medium, an optical storage medium, an electromagnetic storage medium, a semiconductor storage medium, and the like. A more specific example of the computer readable storage medium may include a floppy (registered trademark) disk, a diskette, a hard disk, a random-access memory (RAM), a read-only memory (ROM), an erasable programmable read-only memory (EPROM or flash memory), an electrically erasable programmable read-only memory (EEPROM), a static random-access memory (SRAM), a compact disc read-only memory (CD-ROM), a digital versatile disc (DVD), a Blu-ray (registered trademark) disc, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer readable instructions may be provided to a processor of a general purpose computer, a special purpose computer, or other programmable data processing device, or to programmable circuit, locally or via a local area network (LAN), wide area network (WAN) such as the Internet, and a computer readable instruction may be executed to provide means for executing operations specified in the explained processing procedures or block diagrams. An example of the processor includes a computer processor, a processing unit, a microprocessor, a digital signal processor, a controller, a microcontroller, or the like.

While the present invention has been described with the embodiments, the technical scope of the present invention is not limited to the above-described embodiments. It is apparent to persons skilled in the art that various alterations or improvements can be added to the above-described embodiments. It is also apparent from the description of the claims that the embodiments to which such alterations or improvements are made can be included in the technical scope of the present invention.

The operations, procedures, steps, and stages etc. of each process performed by a device, system, program, and method shown in the claims, specification, or diagrams can be executed in any order as long as the order is not indicated by "before", "prior to", or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

5: system;
10: vehicle;
12: battery;
30, 31: office;
40, 41: electric power control apparatus;
50, 51: integrated management apparatus;

60, 61: vehicle management apparatus;
70: electric power consumer;
80: power generator;
90: electric power grid;
140: electric power control apparatus;
180: server;
190: communication network;
200: processing module;
210: acquisition module;
220: planning module;
230: selection module;
240: management module;
280: storage module;
290: communication module;
300: processing module;
310: acquisition module;
320: arbitration module;
330: selection module;
340: management module;
380: storage module;
390: communication module;
601, 602, 603, 604, 605, 606, 607, 608, 609, 610, 617, 618, 619, 620: sign;
2000: computer;
2010: host controller;
2012: CPU;
2014: RAM;
2020: input/output controller;
2022: communication interface;
2024: flash memory;
2026: ROM;
2040: input/output chip.

What is claimed is:

1. A system, comprising:
a management module which manages a plurality of vehicles by categorization into a plurality of groups based on combinations of deterioration levels and states of charge of a plurality of batteries included in the plurality of vehicles;
a selection module which selects, based on electric power supply or demand information in an electric power grid, a vehicle in which a battery is to be used for an electric power delivery to or from the electric power grid from among vehicles categorized into a particular group of the plurality of groups;
an acquisition module which acquires reservation information for reserving use of a vehicle from among the plurality of vehicles, wherein the reservation information comprises information representing whether to use a battery of the vehicle for either of (i) the electric power delivery to or from the electric power grid or (ii) an operation of the vehicle, and
the selection module selects, based on the reservation information, the vehicle in which the battery is to be used for the electric power delivery to or from the electric power grid from among vehicles categorized into a first group of the plurality of groups, and the vehicle in which the battery is to be used for the operation of the vehicle from among vehicles categorized into a second group of the plurality of groups.
2. The system according to claim 1, wherein
the selection module preferentially selects a vehicle categorized into groups where the deterioration levels are lower, as the vehicle in which the battery is to be used for the electric power delivery.
3. The system according to claim 1, wherein when there is a need to supply electric power from the battery to the electric power grid, the selection module preferentially selects a vehicle categorized into groups where the deterioration levels are lower and the states of charge are higher, as the vehicle in which the battery is to be used for the electric power delivery.

4. The system according to claim 1, wherein when there is a need to supply electric power to the battery from the electric power grid, the selection module preferentially selects a vehicle categorized into groups where the deterioration levels are lower and the states of charge are lower, as the vehicle in which the battery is to be used for the electric power delivery.

5. The system according to claim 1, wherein the second group is a group where the deterioration levels are lower than the first group.

6. The system according to claim 2, wherein when there is a need to supply electric power from the battery to the electric power grid, the selection module preferentially selects a vehicle categorized into groups where the deterioration levels are lower and the states of charge are higher, as the vehicle in which the battery is to be used for the electric power delivery.

7. The system according to claim 2, wherein when there is a need to supply electric power to the battery from the electric power grid, the selection module preferentially selects a vehicle categorized into groups where the deterioration levels are lower and the states of charge are lower, as the vehicle in which the battery is to be used for the electric power delivery.

8. The system according to claim 3, wherein when there is a need to supply electric power to the battery from the electric power grid, the selection module preferentially selects a vehicle categorized into groups where the deterioration levels are lower and the states of charge are lower, as the vehicle in which the battery is to be used for the electric power delivery.

9. The system according to claim 6, wherein when there is a need to supply electric power to the battery from the electric power grid, the selection module preferentially selects a vehicle categorized into groups where the deterioration levels are lower and the states of charge are lower, as the vehicle in which the battery is to be used for the electric power delivery.

10. A method, comprising:

acquiring information representing deterioration levels and states of charge of a plurality of batteries included in a plurality of vehicles;

managing the plurality of vehicles by categorization into a plurality of groups based on combinations of the deterioration levels and the states of charge;

selecting, based on electric power supply or demand information in an electric power grid, a vehicle in which a battery is to be used for an electric power delivery to or from the electric power grid from among vehicles categorized into a particular group of the plurality of groups;

acquiring reservation information for reserving use of a vehicle from among the plurality of vehicles, wherein the reservation information comprises information representing whether to use a battery of the vehicle for either of (i) the electric power delivery to or from the electric power grid or (ii) an operation of the vehicle, and selecting, based on the reservation information, the vehicle in which the battery is to be used for the electric power delivery to or from the electric power grid from among vehicles categorized into a first group of the plurality of groups, and the vehicle in which the battery is to be used for the operation of the vehicle from among vehicles categorized into a second group of the plurality of groups.

11. A non-transitory computer readable storage medium having stored therein a program, the program causing a computer to function as a management module which manages a plurality of vehicles by categorization into a plurality of groups based on combinations of deterioration levels and states of charge of a plurality of batteries included in the plurality of vehicles, and a selection module which selects, based on electric power supply or demand information in an electric power grid, a vehicle in which a battery is to be used for an electric power delivery to or from the electric power grid from among vehicles categorized into a particular group of the plurality of groups;

an acquisition module which acquires reservation information for reserving use of a vehicle from among the plurality of vehicles, wherein the reservation information comprises information representing whether to use a battery of the vehicle for either of (i) the electric power delivery to or from the electric power grid or (ii) an operation of the vehicle, and the selection module selects, based on the reservation information, the vehicle in which the battery is to be used for the electric power delivery to or from the electric power grid from among vehicles categorized into a first group of the plurality of groups, and the vehicle in which the battery is to be used for the operation of the vehicle from among vehicles categorized into a second group of the plurality of groups.

* * * * *